(12) United States Patent
Li et al.

(10) Patent No.: US 11,803,041 B2
(45) Date of Patent: Oct. 31, 2023

(54) PRISM MODULE AND FOLDED LENS USING SAME

(71) Applicant: AAC Optics Solutions Pte. Ltd., Singapore (SG)

(72) Inventors: Linzhen Li, Shenzhen (CN); Zhuming Chu, Shenzhen (CN); Tongming Xu, Shenzhen (CN); Houwei Zhao, Shenzhen (CN); Kai Chen, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 698 days.

(21) Appl. No.: 17/017,771

(22) Filed: Sep. 11, 2020

(65) Prior Publication Data

US 2020/0409125 A1    Dec. 31, 2020

Related U.S. Application Data

(63) Continuation of application No. PCT/CN2019/089719, filed on Jun. 1, 2019.

(51) Int. Cl.
*G02B 13/00* (2006.01)
*G02B 5/04* (2006.01)
*G02B 7/18* (2021.01)
*G02B 27/64* (2006.01)

(52) U.S. Cl.
CPC ........... *G02B 13/0065* (2013.01); *G02B 5/04* (2013.01); *G02B 7/1805* (2013.01); *G02B 27/646* (2013.01)

(58) Field of Classification Search
CPC .... G02B 13/0065; G02B 13/007; G02B 5/04; G02B 7/1805; G02B 27/646
See application file for complete search history.

(56) References Cited

U.S. PATENT DOCUMENTS

2021/0208415 A1*  7/2021  Goldenberg .......... H04N 23/685

FOREIGN PATENT DOCUMENTS

| CN | 202193942 U | * | 4/2012 | |
| CN | 107277313 A | * | 10/2017 | ......... G02B 27/1073 |
| CN | 208922030 U | * | 5/2019 | ........... G02B 27/646 |

OTHER PUBLICATIONS

Machine translation of CN 202193942 retrieved electronically from PE2E Search Aug. 3, 2023 (Year: 2023).*
Machine translation of CN 107277313 retrieved electronically from PE2E Search Aug. 3, 2023 (Year: 2023).*
(Continued)

*Primary Examiner* — Cara E Rakowski
(74) *Attorney, Agent, or Firm* — W&G Law Group

(57) ABSTRACT

The invention provides a prism module and a folded lens. The prism module includes a housing having an accommodation cavity, a prism assembly, a rotation shaft for rotationally connecting the prism assembly and the housing, a driving assembly for driving the prism assembly to rotate around the rotation shaft and a restoring assembly for resetting the prism assembly. The restoring assembly includes a first magnet and a second magnet. The first magnet is fixed on the prism assembly, and the second magnet is fixed on the housing and is set opposite to the first magnet with distance. The prism module of the invention can realize the resetting of the prism assembly, with small space occupation and convenient for assembly.

20 Claims, 6 Drawing Sheets

(56) References Cited

OTHER PUBLICATIONS

Machine translation of CN 208922030 retrieved electronically from PE2E Search Aug. 3, 2023 (Year: 2023).*
English translation of the First Office Action in CN 201910487445.X retrieved electronically from Global Dossier Aug. 2, 2023 (Year: 2023).*

* cited by examiner

PRISM MODULE AND FOLDED LENS USING SAME

FIELD OF THE PRESENT DISCLOSURE

The invention relates to the field of optical technologies, and more particularly to a prism module used in a folded lens.

DESCRIPTION OF RELATED ART

The folded lens generally comprises a prism module and a lens module. A prism assembly in the prism module rotates uniaxially. The prism module has a large reset space and it is not easy to be assembled. Therefore, it is necessary to provide an improved prism module having a small space occupation and a restoring assembly that is easy to assemble.

SUMMARY OF THE INVENTION

One of the main objects of the invention is to provide a prism module with small space occupation and capable of being convenient for assembly.

Accordingly, the present invention provides a prism module, comprising: a housing having an accommodation cavity; a prism assembly provided in the accommodation cavity; a rotation shaft fixed in the accommodation cavity for rotationally connecting the prism assembly with the housing; a driving assembly provided in the accommodation cavity for driving the prism assembly to rotate around the rotation shaft; a restoring assembly provided in the accommodation cavity for resetting the prism assembly. The restoring assembly comprises a first magnet fixed on the prism assembly and a second magnet fixed on the housing and arranged opposite to the first magnet with a distance; the magnetic poles of the first magnet and the second magnet are opposite to each other and attract each other to drive the prism assembly to rotate to a preset position.

Further, the prism assembly comprises a substrate and a prism mounted inside the substrate; the driving assembly comprises a first driving member that drives the prism assembly to move in a first direction and a second driving member that drives the prism assembly to move in a second direction perpendicular to the first direction; the first driving member comprises a first magnetic block and a first coil which are matched with each other; one of the substrate and the housing fixes the first magnetic block, the other of the substrate and the housing fixes the first coil; the second driving member comprises a second magnetic block and a second coil which are matched with each other, one of the substrate and the housing fixes the second magnetic block, the other of the substrate and the housing fixes the second coil.

Further, the first magnet is embedded in the substrate, and the substrate or the housing includes an accommodation grooves corresponding to the rotation shaft, one end of the rotation shaft is received in the accommodation groove and rotationally connected with the accommodation groove.

Further, the first magnet and the second magnet are both cylindrical, and at least two of the restoring assemblies are symmetrically provided at the circumference of the rotation shaft, the central axis of the first magnet is collinear with the central axis of the second magnet and both of them are parallel to the central axis of the rotation shaft.

Further, the rotation shafts are provided on opposite sides of the prism assembly, and the central axes of at least two of the rotation shafts located on different sides of the prism assembly are collinear, and the rotation shaft located on either side of the prism assembly is provided with the restoring assembly at their periphery.

Further, the prism comprises a light inlet surface, a light outlet surface perpendicular to the light inlet surface, a reflective surface connecting the light inlet surface to the light outlet surface, and a connection surface connected to both opposite ends of the reflective surface, the connection surface is connected with the light inlet surface, the light outlet surface and the reflective surface; the substrate comprises a first outer side wall opposite to the light inlet surface, a second outer side wall opposite to the light outlet surface, and a side plate corresponding to the connection surface; the first driving member is correspondingly fixed to the first outer side wall, the second driving member is correspondingly fixed to the second outer side wall, the first magnet is fixed to the side plate, the rotation shaft rotationally connects the side plate with the housing.

Further, the first magnetic block is embedded in the first outer side wall and the second magnetic block is embedded in the second outer side wall.

Further, the side plate is convexly provided with a first convex platform toward the housing direction, the first convex platform concavely forms a first mounting groove accommodation the first magnet.

Further, the substrate further comprises a light inlet side wall corresponding to the light inlet surface, and a light outlet side wall corresponding to the light outlet surface; the light inlet side wall, the light outlet side wall, the first outer side wall, the second outer side wall and the side plate form a rectangle frame; the substrate further comprises a positioning bump provided in the rectangle frame; the common limit of the positioning bump and the rectangle frame forms an accommodation groove for accommodation the prism; the light inlet side wall is provided with a light inlet opening therethrough, and the light outlet side wall includes a light outlet opening therethrough.

Further, the housing is provided with a second mounting groove opposite to the first mounting groove with distance and adapted to the second magnet, the second magnet is positioned inside the second mounting groove.

Further, the accommodation groove is a spherical groove and is formed on the substrate; the rotation shaft is fixed on the housing, one end of the rotation shaft which is far away from the housing is provided with a spherical convex platform, the spherical convex platform abuts against the bottom of groove of the spherical groove; or, the accommodation groove is a spherical groove and is formed on the housing; the rotation shaft is fixed on the prism assembly, one end of the rotation shaft away from the prism assembly is provided with a spherical convex platform, and the spherical convex platform abuts against the bottom of groove of the spherical groove.

Further, the first coil and the second coil are both fixed to the housing, and the prism assembly further comprises a circuit board fixed to the housing; the circuit board comprises a first conductive part embedded in the housing and opposite to the first outer side wall, a second conductive par extending from the first conductive part and fixed to the housing and facing the second outer side wall, and an outer conductive part extending from the first conductive part to outside the housing; the first conductive part is electrically connected with the first coil, and the second conductive part is electrically connected with the second coil.

The present invention further provides a folded lens comprising such a prism module as described above and a lens module attached to one side of that prism module.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
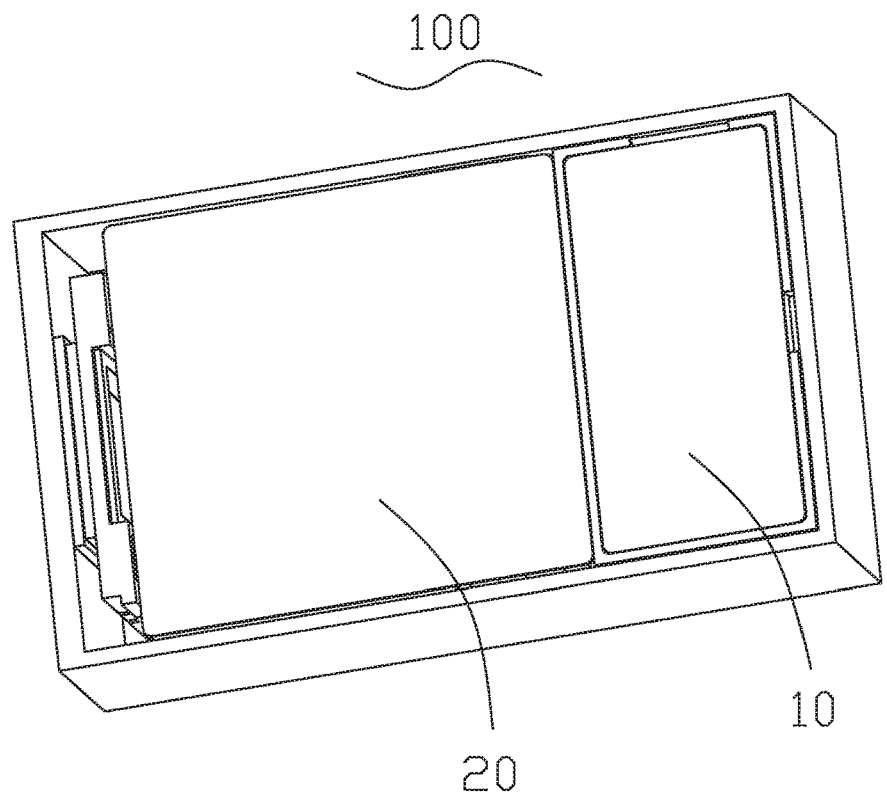
FIG. 1 is an isometric view of a folded lens in accordance with an exemplary embodiment of the invention.

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby are only to explain the disclosure, not intended to limit the disclosure.

The present invention provides a prism module 10, which is applied to a folded lens 100. Referring to FIGS. 1-9, the prism module 10 comprises a housing having an accommodation cavity 101, a prism assembly 2 provided in the accommodation cavity 101, a rotation shaft 3 fixed inside the accommodation cavity 101 and used to rotationally connect the prism assembly 2 and the housing 1, a driving assembly 5 provided in the accommodation cavity 101 for driving the prism assembly 2 to rotate around the rotation shaft 3, and a restoring assembly 4 provided in the accommodation cavity 101 for resetting the prism assembly 2. The restoring assembly 4 comprises a first magnet 41 fixed on the prism assembly 2 and a second magnet 42 fixed on the housing 1 and arranged opposite to the first magnet 41 with distance. The magnetic poles of the first magnet 41 and the second magnet 42 are opposite to each other and attract each other to drive the prism assembly 2 rotate to a preset position.

The magnetic poles of the first magnet 41 and the second magnet 42 attract each other to form a magnetic spring, and when the prism assembly 2 rotates, the first magnet 41 is driven to move, and the restoring force between the first magnet 41 and the second magnet 42 forms a restoring torque to reset the prism assembly 2.

Figure 4:
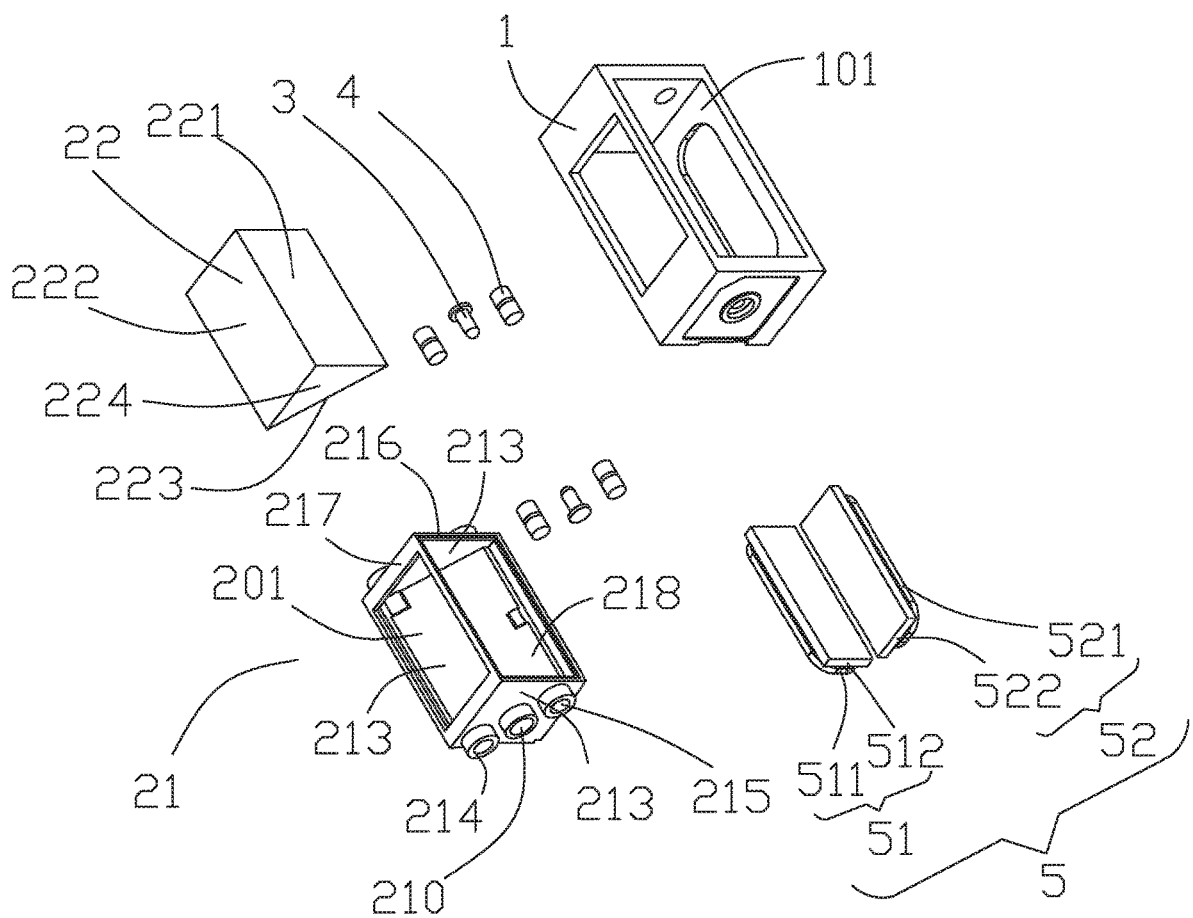
FIG. 4 is an exploded view of the prism module of the folded lens.

Preferably, referring to FIG. 4, the prism assembly 2 comprises a substrate 21 and a prism 22 installed in the substrate 21. The driving assembly 5 comprises a first driving member 51 that drives the prism assembly 2 to move in a first direction and a second driving member 52 that drives the prism assembly 2 to move in a second direction perpendicular to the first direction. The first driving member 51 comprises a first magnetic block 512 and a first coil 511 that cooperate with each other. One of the substrate 21 and the housing 1 fixes the first magnetic block 512, and the other one of the substrate 21 and the housing 1 fixes the first coil 511. The second driving member 52 comprises a second magnetic block 522 and a second coil 521 that cooperate with each other. One of the substrate 21 and the housing 1 fixes the second magnetic block 522, and the other of the substrate 21 and the housing 1 fixes the second coil 521.

The driving direction of the first driving member 51 and the driving direction of the second driving member 52 are perpendicular to each other so that the first driving member 51 and the second driving member 52 cooperate to drive the prism assembly 2 to rotate. The substrate 21 is installed in the housing 1 to install prism 22. The first coil 511 and the second coil 521 are both in the shape of a raceway, the central axis of the first coil 511 is parallel to the first direction, and the central axis of the second coil 521 is parallel to the second direction.

Figure 7:
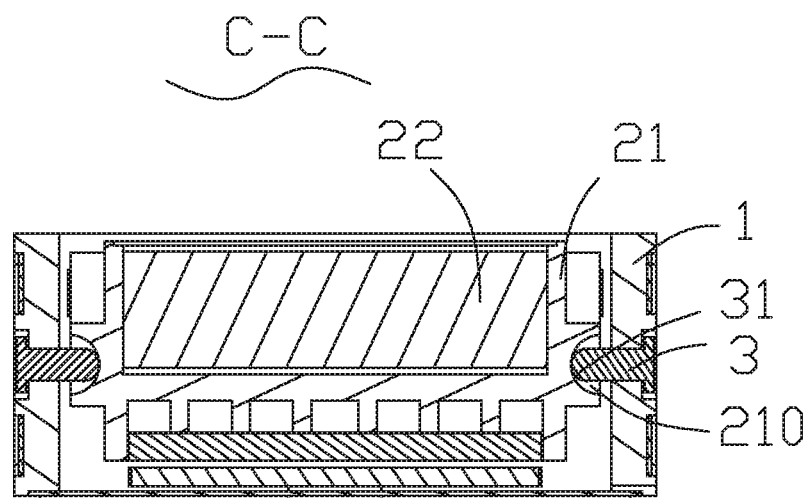
FIG. 7 is a cross-sectional view of the prism module taken along line C-C in FIG. 3.

Preferably, referring to FIGS. 4 and 7, the first magnet 41 is embedded in the substrate 21, and the substrate 21 or the housing 1 is formed with an accommodation groove 210 corresponding to the rotation shaft 3. One end of the rotation shaft 3 is accommodated in the accommodation groove 210 and is rotationally connected to the accommodation groove 210.

The rotation shaft 3 may be fixed on the substrate 21 or on the housing 1. When rotation shaft 3 is fixed on the substrate 21, the accommodation groove 210 is provided on the housing 1, when the rotation shaft 3 is fixed on the housing 1, the accommodation groove 210 is provided on the substrate 21.

Preferably, referring to FIGS. 4 and 7, both the first magnet 41 and the second magnet 42 are cylindrical, and at least two of the restoring assemblies 4 are symmetrically provided on the periphery of the rotation shaft 3. The central axis of the first magnet 41 is collinear with the central axis of the second magnet 42 and both are parallel to the central axis of the rotation shaft 3.

The cylindrical magnet ensures the isotropy of restoring rigidity, the central axis of the two magnets are collinear so that the restoring force between them is parallel to the rotation direction of the prism assembly 2.

Figure 8:
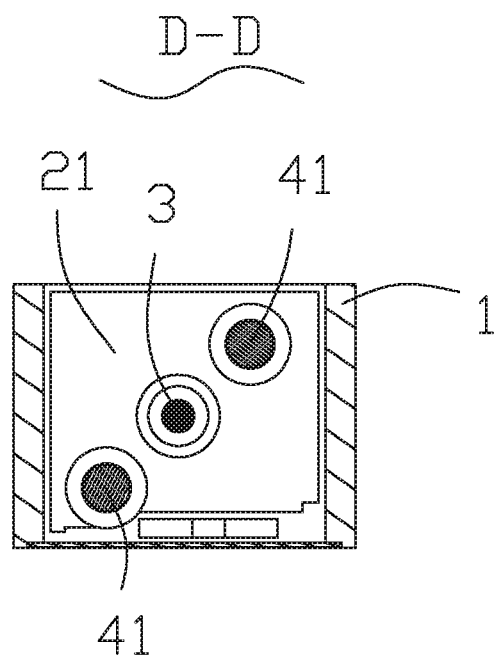
FIG. 8 is a cross-sectional view of the prism module taken along line D-D in FIG. 3.
Figure 9:
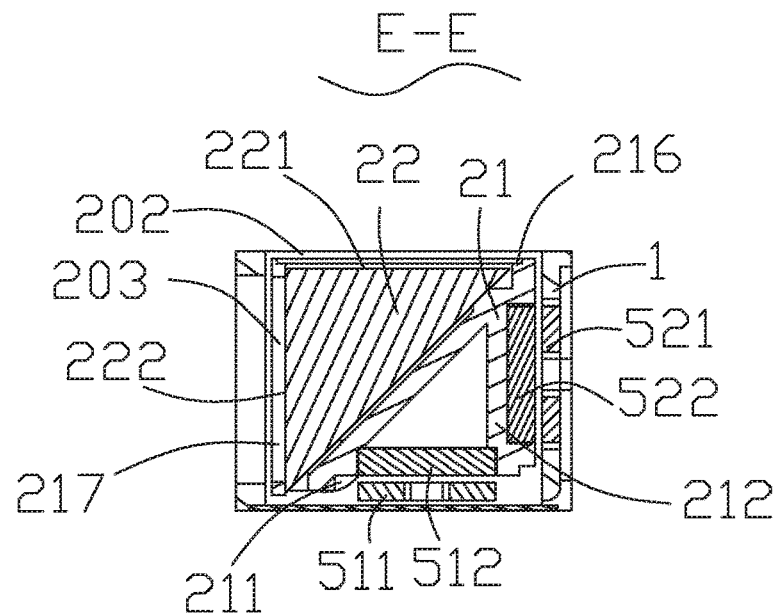
FIG. 9 is a cross-sectional view of the prism module taken along line E-E in FIG. 3.

Preferably, referring to FIGS. 4, 7 and 8, the rotation shaft 3 is provided on two opposite sides of the prism assembly 2, and the central axes of at least two of the rotation shafts 3 located on different sides of the prism assembly 2 are collinear, and the rotation shaft 3 located on either side of the prism assembly 2 is provided with the restoring assembly 4 at their periphery.

The two rotation shafts 3 are distributed on both sides of the prism assembly 2 along the rotation axes of the prism 22, and it can be understood that the two rotation shafts 3 are collinear, and the two sides of each rotation shaft 3 are correspondingly provided with a restoring assembly 4.

Preferably, referring to FIG. 4, the prism 22 comprises a light inlet surface 221 and a light outlet surface 222 perpendicular to each other, a reflective surface 223 connecting the light inlet surface 221 and the light outlet surface 222, a connection surface 224 connected to both opposite ends of the reflective surface 223. The connection surface 334, the light inlet surface 221, the light outlet surface 222 and the reflective surface 223 are connected. The substrate 21 comprises a first outer side wall 211 opposite to the light inlet surface 221, a second outer side wall 212 opposite to the light outlet surface 222, and a side plate 213 corresponding to the connection surface 224. The first driving member 51 is correspondingly fixed to the first outer side wall 211, and the second driving member 52 is correspondingly fixed to the second outer side wall 212. The first magnet 41 is fixed to the side plate 213, while the rotation shaft 3 rotationally connects the side plate 213 with the housing 1.

Figure 2:
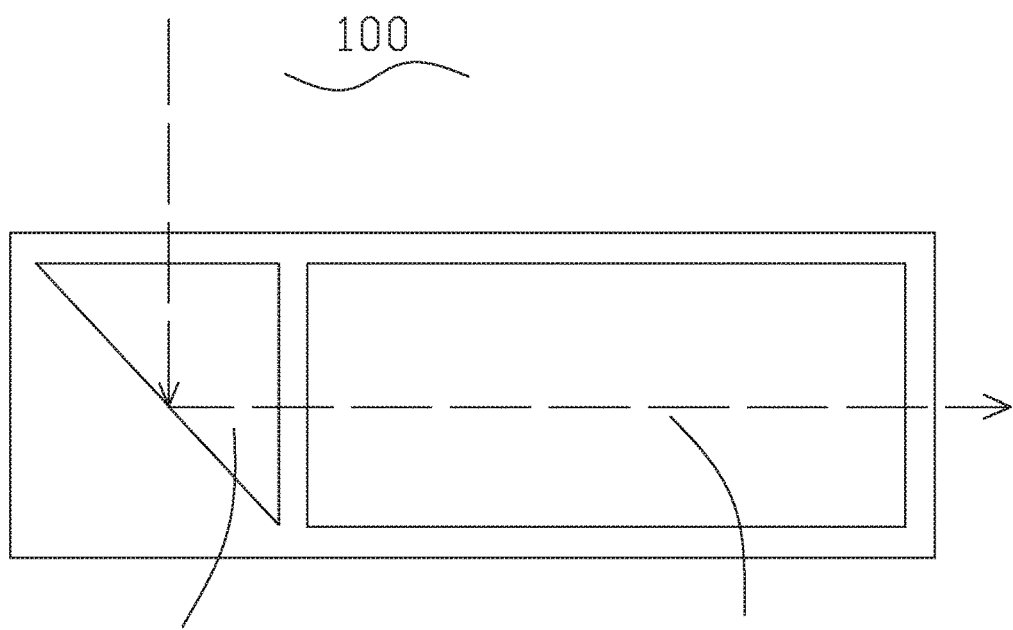
FIG. 2 is a top view of the folded lens in FIG. 1 for showing the light path thereof.
Figure 3:
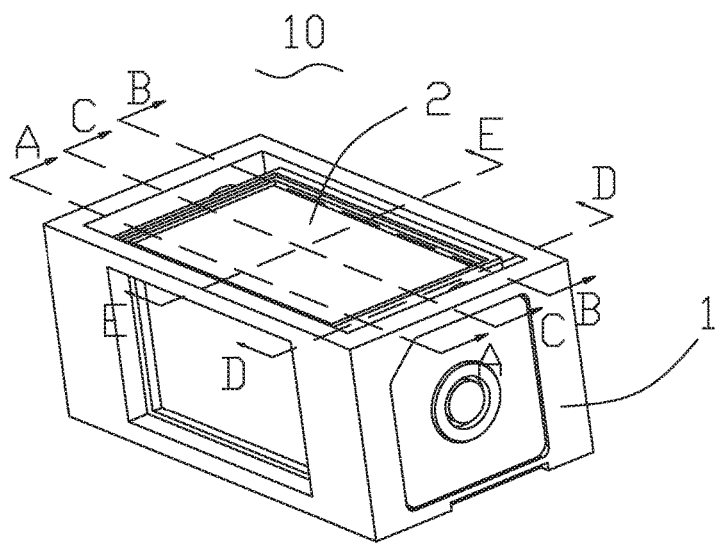
FIG. 3 is an isometric view of a prism module of the folded lens.

The light inlet surface 221 faces upward, and the light outlet surface 222 faces the lens module 20, the reflective surface 223 is used to reflect the light from the light inlet surface 221 to the light outlet surface 222, and the connection surface 224 is provided on both sides along the length direction of the prism 22. Specifically, referring to FIG. 2, the dashed line with an arrow in FIG. 2 is shown as the optical path of the folded lens 100, and the arrow direction is the light irradiation direction.

Figure 5:
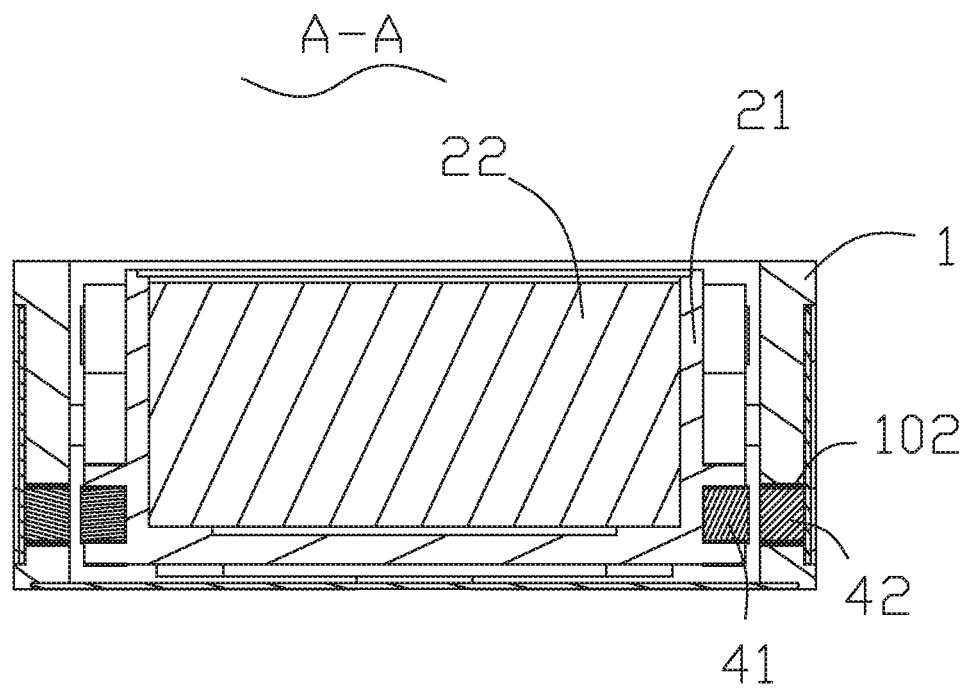
FIG. 5 is a cross-sectional view of the prism module taken along line A-A in FIG. 3.
Figure 6:
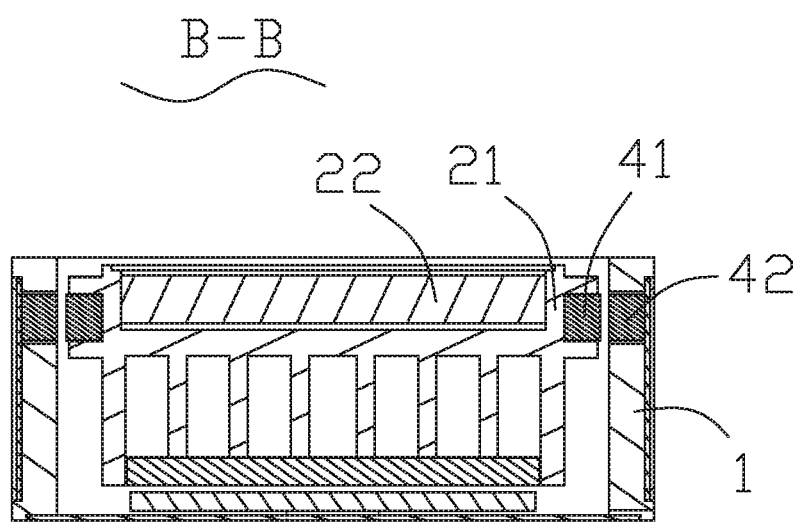
FIG. 6 is a cross-sectional view of the prism module taken along line B-B in FIG. 3.

Preferably, referring to FIGS. 5 and 6, the first magnetic block 512 is embedded in the first outer side wall 211, and the second magnetic block 522 is embedded in the second outer side wall 212.

The first outer side wall 211 and the second outer side wall 212 are oriented toward housing 1, the interaction of the first magnetic block 512 and the first coil 511 drives the prism assembly 2 to move in a direction parallel to the light inlet surface. The second magnetic block 522 and the second coil 521 work together to drive the prism assembly 2 to move in the direction of the light outlet surface.

Preferably, referring to FIG. 4, the side plate 213 is convexly provided with a first convex plate 214 in the direction of the housing 1, and the first convex plate 214 is concavely formed with a first mounting groove 215 for accommodation the first magnet 41.

A first mounting groove 215 is provided through the first convex platform 214, effectively reducing the thickness of the side platform 213.

Preferably, referring to FIGS. 4 and 7, the substrate 21 also comprises a light inlet side wall 216 corresponding to the light inlet surface 221, and a light outlet side wall 217 corresponding to the light outlet surface 222. The light inlet side wall 216, the light outlet side wall 217, the first outer side wall 211, the second outer wall side 212 and the side plate 213 form a rectangle frame. The substrate 21 also comprises a positioning bump 218 provided in the rectangle frame. The common limit of the positioning bump 218 and the rectangle frame forms an accommodation groove 201 that accommodates the prism 22; the light inlet side wall 216 is provided with a light inlet opening 202 through it and the light outlet side wall 217 is provided with a light outlet opening 203 through it.

The positioning bump 218 and the prism 22 are both in a shape of triangular prism. The light inlet side wall 216 and the light outlet side wall 217 are transparent to the light inlet surface 221 and the light outlet surface 222, respectively.

Preferably, a second mounting groove 102 provided opposite to the first mounting groove 215 with distance and adapted to the second magnet 42 is provided on the housing 1, the second magnet 42 is positioned in the second mounting groove 102.

The second mounting groove 102 is used to position the second magnet 42, with the first mounting groove 215 opposite to the second mounting groove 102, corresponding to the first magnet 41 and the second magnet 42.

Preferably, the substrate 21 is formed with the accommodation groove 210, and the accommodation groove 210 is a spherical groove 210, and the rotation shaft 3 is fixed on the housing 1. One end of the rotation shaft 3 away from the housing 1 is provided with a spherical convex platform 31, the spherical convex platform 31 is abutted against the bottom of groove of the spherical groove 210; or, The accommodation groove 210 is formed on the housing, and the accommodation groove 210 is a spherical groove 210, and the rotation shaft 3 is fixed on the prism assembly 2. One end of the rotation shaft 3 away from the prism assembly 2 is provided with a spherical convex platform 31, the spherical convex platform 31 buts against the bottom of groove of the spherical groove 210.

The spherical convex platform 31 and the spherical groove cooperate, when the prism assembly 2 rotates, the rotation shaft 3 rotates relative to the spherical groove to achieve the point contact of the rotation fulcrum, thus reducing the friction resistance as much as possible.

Figure 10:
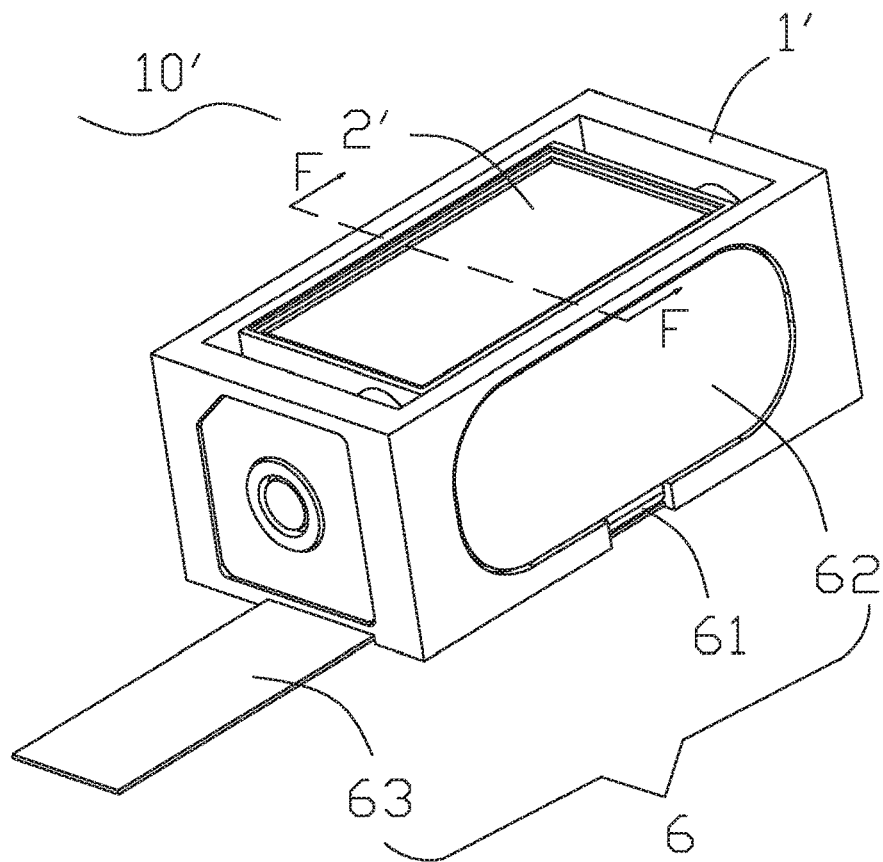
FIG. 10 is an isometric view of a prism module in accordance with another exemplary embodiment of the present invention.
Figure 11:
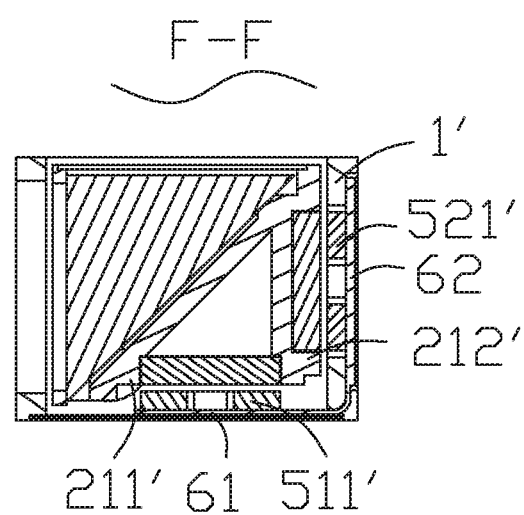
FIG. 11 is a cross-sectional view of the prism module taken along line F-F in FIG. 10.

Preferably, referring to FIGS. 10-11, in another embodiment of the present invention, the prism assembly 10' further comprises a circuit board 6 fixed to the housing 1'. As with that embodiment describe above, the first coil 511' and the second coil 521' are both fixed to the house 1'. The circuit board 6 comprises a first conductive part 61 embedded in the housing 1' opposite to the first outer side wall 211', a second conductive part 62 bent and extended from the first conductive part 61 and fixed to the housing 1' and opposite to the second outer side wall 212', and an outer conductive part 63 extending from the first conductive part 61 out of the housing 1'. The first conductive part 61 is electrically connected to the first coil 511', the second conductive part 62 is electrically connected to the second coil 521'.

The first conductive part 61 energizes the first coil 511' and the second conductive part 62 energizes the second coil 521'. The outer conductive part 63 electrically connects the first conductive part 61 and the second conductive part 62 to the outer circuit.

The invention also relates to a folded lens 100 comprising a prism module 10 as described above and a lens module 20 provided on one side of the prism module 10.

To sum up, the lens module 10 provided by the invention is composed of four sets of magnetic springs which are symmetrical with respect to the center of the rotation shaft. After the relative displacement of each set of magnetic springs occurs due to the rotation of the prism assembly 2, the restoring force of the magnetic spring bracket forms a restoring torque around the rotation shaft. And a form of cooperation between a small convex spherical surface and a large concave spherical surface is applied between the rotation shaft 3 and the spherical groove 210, which is conducive to achieving the point contact of the rotating fulcrum, so that the friction resistance is as low as possible.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A prism module, comprising:
a housing having an accommodation cavity;
a prism assembly provided in the accommodation cavity;

a rotation shaft fixed in the accommodation cavity for rotationally connecting the prism assembly with the housing;

a driving assembly provided in the accommodation cavity for driving the prism assembly to rotate around the rotation shaft;

a restoring assembly provided in the accommodation cavity for resetting the prism assembly; wherein the restoring assembly comprises a first magnet fixed on the prism assembly and a second magnet fixed on the housing and arranged opposite to the first magnet with a distance; the magnetic poles of the first magnet and the second magnet are opposite to each other and attract each other to drive the prism assembly to rotate to a preset position.

2. The prism module as described in claim 1, wherein the prism assembly comprises a substrate and a prism mounted inside the substrate; the driving assembly comprises a first driving member that drives the prism assembly to move in a first direction and a second driving member that drives the prism assembly to move in a second direction perpendicular to the first direction; the first driving member comprises a first magnetic block and a first coil which are matched with each other; one of the substrate and the housing fixes the first magnetic block, the other of the substrate and the housing fixes the first coil; the second driving member comprises a second magnetic block and a second coil which are matched with each other, one of the substrate and the housing fixes the second magnetic block, the other of the substrate and the housing fixes the second coil.

3. The prism module as described in claim 2, wherein the first magnet is embedded in the substrate, and the substrate or the housing includes an accommodation grooves corresponding to the rotation shaft, one end of the rotation shaft is received in the accommodation groove and rotationally connected with the accommodation groove.

4. The prism module as described in claim 3, wherein the first magnet and the second magnet are both cylindrical, and at least two of the restoring assemblies are symmetrically provided at the circumference of the rotation shaft, the central axis of the first magnet is collinear with the central axis of the second magnet and both of them are parallel to the central axis of the rotation shaft.

5. The prism module as described in claim 4, wherein the rotation shafts are provided on opposite sides of the prism assembly, and the central axes of at least two of the rotation shafts located on different sides of the prism assembly are collinear, and the rotation shaft located on either side of the prism assembly is provided with the restoring assembly at their periphery.

6. The prism module as described in claim 5, wherein the prism comprises a light inlet surface, a light outlet surface perpendicular to the light inlet surface, a reflective surface connecting the light inlet surface to the light outlet surface, and a connection surface connected to both opposite ends of the reflective surface, the connection surface is connected with the light inlet surface, the light outlet surface and the reflective surface; the substrate comprises a first outer side wall opposite to the light inlet surface, a second outer side wall opposite to the light outlet surface, and a side plate corresponding to the connection surface; the first driving member is correspondingly fixed to the first outer side wall, the second driving member is correspondingly fixed to the second outer side wall, the first magnet is fixed to the side plate, the rotation shaft rotationally connects the side plate with the housing.

7. The prism module as described in claim 6, wherein the first magnetic block is embedded in the first outer side wall and the second magnetic block is embedded in the second outer side wall.

8. The prism module as described in claim 7, wherein the accommodation groove is a spherical groove and is formed on the substrate; the rotation shaft is fixed on the housing, one end of the rotation shaft which is far away from the housing is provided with a spherical convex platform, the spherical convex platform abuts against the bottom of groove of the spherical groove; or, the accommodation groove is a spherical groove and is formed on the housing; the rotation shaft is fixed on the prism assembly, one end of the rotation shaft away from the prism assembly is provided with a spherical convex platform, and the spherical convex platform abuts against the bottom of groove of the spherical groove.

9. The prism module as described in claim 7, wherein the first coil and the second coil are both fixed to the housing, and the prism assembly further comprises a circuit board fixed to the housing; the circuit board comprises a first conductive part embedded in the housing and opposite to the first outer side wall, a second conductive par extending from the first conductive part and fixed to the housing and facing the second outer side wall, and an outer conductive part extending from the first conductive part to outside the housing; the first conductive part is electrically connected with the first coil, and the second conductive part is electrically connected with the second coil.

10. The prism module as described in claim 6, wherein the side plate is convexly provided with a first convex platform toward the housing direction, the first convex platform concavely forms a first mounting groove accommodation the first magnet.

11. The prism module as described in claim 10, wherein the housing is provided with a second mounting groove opposite to the first mounting groove with distance and adapted to the second magnet, the second magnet is positioned inside the second mounting groove.

12. The prism module as described in claim 11, wherein the accommodation groove is a spherical groove and is formed on the substrate; the rotation shaft is fixed on the housing, one end of the rotation shaft which is far away from the housing is provided with a spherical convex platform, the spherical convex platform abuts against the bottom of groove of the spherical groove; or, the accommodation groove is a spherical groove and is formed on the housing; the rotation shaft is fixed on the prism assembly, one end of the rotation shaft away from the prism assembly is provided with a spherical convex platform, and the spherical convex platform abuts against the bottom of groove of the spherical groove.

13. The prism module as described in claim 10, wherein the accommodation groove is a spherical groove and is formed on the substrate; the rotation shaft is fixed on the housing, one end of the rotation shaft which is far away from the housing is provided with a spherical convex platform, the spherical convex platform abuts against the bottom of groove of the spherical groove; or, the accommodation groove is a spherical groove and is formed on the housing; the rotation shaft is fixed on the prism assembly, one end of the rotation shaft away from the prism assembly is provided with a spherical convex platform, and the spherical convex platform abuts against the bottom of groove of the spherical groove.

14. The prism module as described in claim 6, wherein the substrate further comprises a light inlet side wall corresponding to the light inlet surface, and a light outlet side wall corresponding to the light outlet surface; the light inlet side wall, the light outlet side wall, the first outer side wall, the second outer side wall and the side plate form a rectangle frame; the substrate further comprises a positioning bump provided in the rectangle frame; the common limit of the positioning bump and the rectangle frame forms an accommodation groove for accommodation the prism; the light inlet side wall is provided with a light inlet opening therethrough, and the light outlet side wall includes a light outlet opening therethrough.

15. The prism module as described in claim 14, wherein the accommodation groove is a spherical groove and is formed on the substrate; the rotation shaft is fixed on the housing, one end of the rotation shaft which is far away from the housing is provided with a spherical convex platform, the spherical convex platform abuts against the bottom of groove of the spherical groove; or, the accommodation groove is a spherical groove and is formed on the housing; the rotation shaft is fixed on the prism assembly, one end of the rotation shaft away from the prism assembly is provided with a spherical convex platform, and the spherical convex platform abuts against the bottom of groove of the spherical groove.

16. A folded lens, comprising a prism module as described in claim 1 and a lens module attached to one side of that prism module.

17. The prism module as described in claim 3, wherein the accommodation groove is a spherical groove and is formed on the substrate; the rotation shaft is fixed on the housing, one end of the rotation shaft which is far away from the housing is provided with a spherical convex platform, the spherical convex platform abuts against the bottom of groove of the spherical groove; or, the accommodation groove is a spherical groove and is formed on the housing; the rotation shaft is fixed on the prism assembly, one end of the rotation shaft away from the prism assembly is provided with a spherical convex platform, and the spherical convex platform abuts against the bottom of groove of the spherical groove.

18. The prism module as described in claim 4, wherein the accommodation groove is a spherical groove and is formed on the substrate; the rotation shaft is fixed on the housing, one end of the rotation shaft which is far away from the housing is provided with a spherical convex platform, the spherical convex platform abuts against the bottom of groove of the spherical groove; or, the accommodation groove is a spherical groove and is formed on the housing; the rotation shaft is fixed on the prism assembly, one end of the rotation shaft away from the prism assembly is provided with a spherical convex platform, and the spherical convex platform abuts against the bottom of groove of the spherical groove.

19. The prism module as described in claim 5, wherein the accommodation groove is a spherical groove and is formed on the substrate; the rotation shaft is fixed on the housing, one end of the rotation shaft which is far away from the housing is provided with a spherical convex platform, the spherical convex platform abuts against the bottom of groove of the spherical groove; or, the accommodation groove is a spherical groove and is formed on the housing;

the rotation shaft is fixed on the prism assembly, one end of the rotation shaft away from the prism assembly is provided with a spherical convex platform, and the spherical convex platform abuts against the bottom of groove of the spherical groove.

20. The prism module as described in claim 6, wherein the accommodation groove is a spherical groove and is formed on the substrate; the rotation shaft is fixed on the housing, one end of the rotation shaft which is far away from the housing is provided with a spherical convex platform, the spherical convex platform abuts against the bottom of groove of the spherical groove; or, the accommodation groove is a spherical groove and is formed on the housing; the rotation shaft is fixed on the prism assembly, one end of the rotation shaft away from the prism assembly is provided with a spherical convex platform, and the spherical convex platform abuts against the bottom of groove of the spherical groove.

* * * * *